US008381003B2

(12) United States Patent
Suzuki et al.

(10) Patent No.: US 8,381,003 B2
(45) Date of Patent: Feb. 19, 2013

(54) MEMORY RELOCATION IN COMPUTER FOR POWER SAVING

(75) Inventors: Kumiko Suzuki, Tokyo (JP); Jun Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 157 days.

(21) Appl. No.: 12/862,056

(22) Filed: Aug. 24, 2010

(65) Prior Publication Data

US 2011/0055452 A1 Mar. 3, 2011

(30) Foreign Application Priority Data

Aug. 26, 2009 (JP) ................................. 2009-195450

(51) Int. Cl.
*G06F 1/32* (2006.01)

(52) U.S. Cl. .......................... 713/320; 713/321; 713/324

(58) Field of Classification Search .......... 713/300–340; 712/28

See application file for complete search history.

(56) References Cited

U.S. PATENT DOCUMENTS

| | | | | |
|---|---|---|---|---|
| 6,330,639 | B1 * | 12/2001 | Fanning et al. ............... | 711/106 |
| 8,046,618 | B2 * | 10/2011 | Ohmori ......................... | 713/324 |
| 8,112,648 | B2 * | 2/2012 | Branover et al. ............. | 713/320 |
| 8,140,808 | B2 * | 3/2012 | Rawson, III ................... | 711/170 |
| 2004/0111596 | A1 * | 6/2004 | Rawson, III ....................... | 713/1 |
| 2009/0125730 | A1 * | 5/2009 | Pagan ............................ | 713/300 |
| 2009/0150651 | A1 * | 6/2009 | Ohmori ........................... | 712/28 |
| 2009/0235099 | A1 * | 9/2009 | Branover et al. ............. | 713/322 |
| 2009/0307441 | A1 * | 12/2009 | Hepkin et al. ................. | 711/153 |
| 2010/0100696 | A1 * | 4/2010 | Suzuki ............................ | 711/162 |
| 2010/0199280 | A1 * | 8/2010 | Vestal et al. ................... | 718/102 |

FOREIGN PATENT DOCUMENTS

| | | |
|---|---|---|
| JP | 10-254587 A | 9/1998 |
| JP | 2006031263 A | 2/2006 |
| JP | 2006146998 A | 6/2006 |
| JP | 2008217302 A | 9/2008 |
| JP | 2008217421 A | 9/2008 |
| JP | 2008243049 A | 10/2008 |
| JP | 2009009194 A | 1/2009 |
| JP | 2009500705 A | 1/2009 |
| JP | 2009140304 A | 6/2009 |
| JP | 2009151745 A | 7/2009 |

OTHER PUBLICATIONS

Japanese Office Action for JP2009-195450 issued Jul. 1, 2011.

* cited by examiner

*Primary Examiner* — Raymond Phan

(57) ABSTRACT

A computer system comprises a computer that includes a plurality of CPU sockets including one or more CPU cores, a crossbar switch, and a memory controller each, and memories connected under the respective plurality of CPU sockets, the plurality of CPU sockets being connected to each other. When all the CPU cores in a CPU socket enter a power saving state and a total amount of memory use falls below a predetermined threshold, the computer relocates contents of the memory connected under the CPU socket to a memory under another CPU socket, thereby eliminating an access to the memory connected under the CPU socket and bringing a whole of the CPU socket into the power saving state.

6 Claims, 3 Drawing Sheets

EXAMPLE OF MEMORY USAGE
(BEFORE RELOCATION)

EXAMPLE OF MEMORY USAGE
(AFTER RELOCATION)

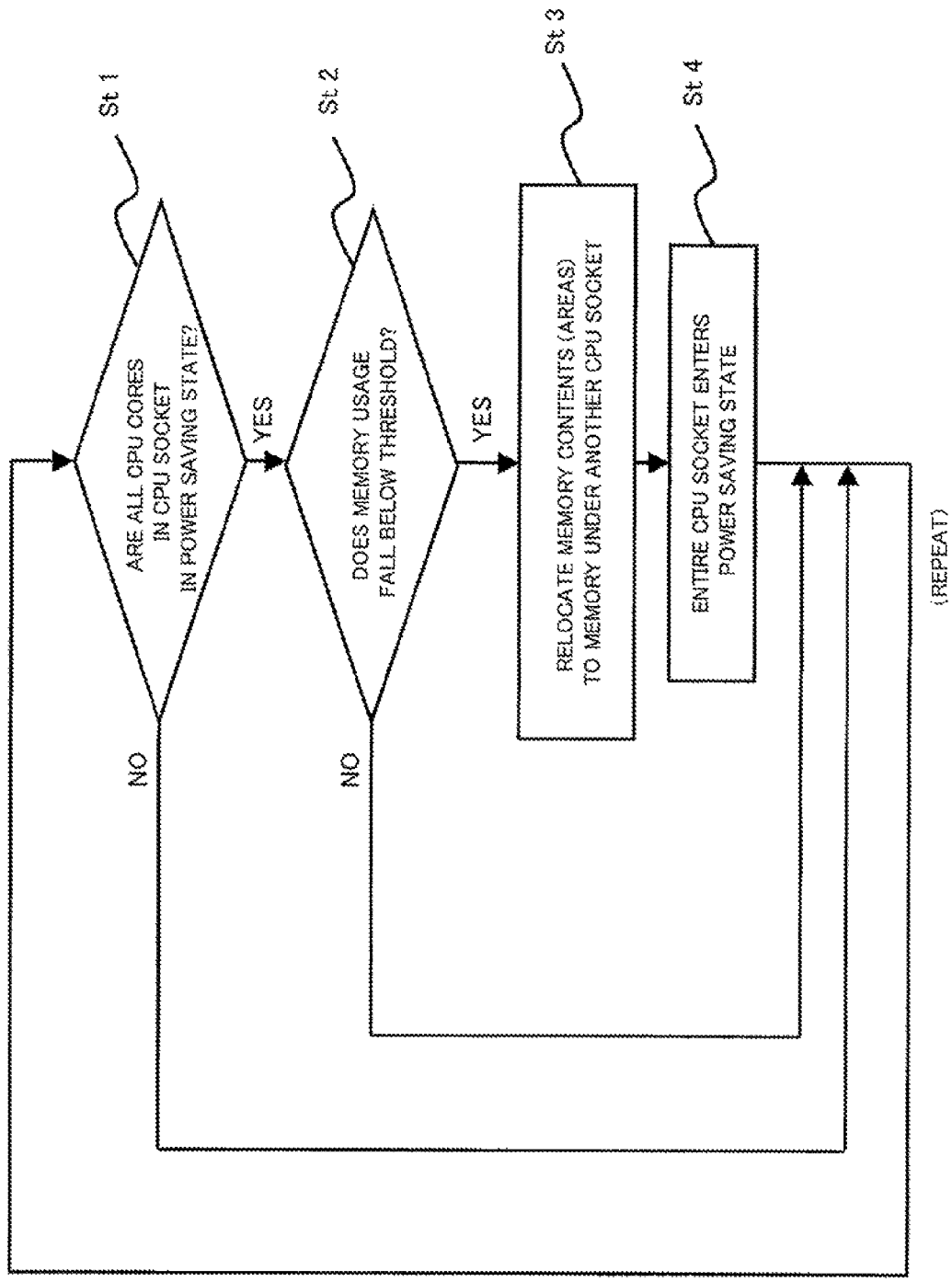

MEMORY RELOCATION IN COMPUTER FOR POWER SAVING

This application is based upon and claims the benefit of priority from prior Japanese Patent Application No. 2009-195450, filed Aug. 26, 2009, the entire contents of which are incorporated herein.

TECHNICAL FIELD

The present invention relates to a method and program for memory relocation control of a computer, and a computer system, and more particularly to memory relocation based on a threshold control on the memory usage.

BACKGROUND ART

With a rapid increase of the computer power consumption, a reduction in energy cost has recently been desired.

For example, suppose that a computer is constituted by connecting a plurality of CPU sockets each including one or more CPU (Central Processing Unit) cores, a memory controller, a memory, and a crossbar switch. There is a known technology in which the OS (Operating System) brings unneeded CPU cores into a power saving state when the amount of processing needed is low, and brings an entire CPU socket into the power saving state when all the CPU cores in the CPU socket are in the power saving state and there is no access from the memory controller in the CPU socket to the memory connected.

PTL 1 proposes a method for a system that performs automatic data migration between a plurality of memory storage devices containing application program data. The method includes monitoring data accesses, determining to change the memory allocations of the data in consideration of service-level requirements of the application program, and automatically transferring data between the plurality of memory storage devices according to the determination.

PTL 2 proposes a method for a system that includes a plurality of modules with a built-in data memory. In the method, memory capacities and power consumption are stored in a backup management table. Upon transition to backup, the table is consulted to determine whether or not the data stored in each module can be collected to some of the modules for lower power consumption. If the data can be collected, all the data is transferred from the rest of the modules to the certain module(s), and the power supply to the rest of the modules is stopped to reduce power during data backup.

CITATION LIST

Patent Literature

{PTL 1} JP-T-2009-500705
{PTL 2} JP-A-2008-217421

SUMMARY OF INVENTION

Technical Problem

The foregoing technology of bringing an entire CPU socket into the power saving state does not take care of the physical memory address when the OS makes a memory access. Even if all the CPU cores in a CPU socket are in the power saving state, the memory connected to the CPU socket can thus be accessed from the CPU cores of the other CPU sockets. This reduces the chances for an entire CPU socket to enter the power saving state even if all the CPU cores in the CPU socket are in the power saving state. Consequently, there is a problem that a decrease in the amount of processing of the computer is less likely to result in reduced power consumption of the computer.

PTL 1 is not concerned with such a problem. PTL 2 is intended to reduce the computer power consumption, whereas the reduction is targeted only for during data backup. No consideration is made for a reduction in the computer power consumption in normal operation.

An exemplary object of the present invention is to solve the foregoing problem and provide a computer system and its method and program for memory relocation control which can actively bring CPU sockets into the power saving state when the amount of use of the computer decreases, thereby reducing the power consumption of the computer.

Solution to Problem

To achieve the foregoing exemplary object, a computer system according to an exemplary aspect of the present invention includes: a computer that has a plurality of CPU sockets including one or more CPU cores, a crossbar switch, and a memory controller each, and a plurality of memories connected under each of the plurality of CPU sockets, the plurality of CPU sockets being connected to each other. When all the CPU cores in a CPU socket enter a power saving state and a total memory usage falls below a predetermined threshold, the computer relocates contents of the memory connected under the CPU socket to a memory connected under another CPU socket, thereby eliminating an access to the memory connected under the CPU socket and bringing a whole of the CPU socket into the power saving state.

A method for memory relocation control according to an exemplary aspect of the present invention is a method for memory relocation control of a computer that includes a plurality of CPU sockets including one or more CPU cores, a crossbar switch, and a memory controller each, and a plurality of memories connected under each of the plurality of CPU sockets, the plurality of CPU sockets being connected to each other. The method includes: when all the CPU cores in a CPU socket enter a power saving state and a total memory usage falls below a predetermined threshold, relocating, at the computer, contents of the memory connected under the CPU socket to a memory connected under another CPU socket, thereby eliminating an access to the memory connected under the CPU socket and bringing a whole of the CPU socket into the power saving state.

A program for memory relocation control according to an exemplary aspect of the present invention is a program for memory relocation control of a computer that includes a plurality of CPU sockets including one or more CPU cores, a crossbar switch, and a memory controller each, and a plurality of memories connected under each of the plurality of CPU sockets, the plurality of CPU sockets being connected to each other. The program causes the computer to execute: a process of, when all the CPU cores in a CPU socket enter a power saving state and a total memory usage falls below a predetermined threshold, relocating contents of the memory connected under the CPU socket to a memory connected under another CPU socket, thereby eliminating an access to the memory connected under the CPU socket and bringing a whole of the CPU socket into the power saving state.

Advantageous Effects of Invention

According to the present invention, it is possible to actively bring CPU sockets into the power saving state when the amount of use of the computer decreases, thereby reducing the power usage of the computer.

BRIEF DESCRIPTION OF DRAWINGS

FIG. 3 A schematic flowchart for explaining the method for memory relocation control of a computer according to the exemplary embodiment of the present invention.

DESCRIPTION OF EMBODIMENTS

Now, an exemplary embodiment of the method and program for memory reallocation control of a computer and the computer system according to the present invention will be described in detail with reference to the drawings.

The present exemplary embodiment deals with the application of a method for memory relocation control of relocating memory contents (areas) of a computer depending on the threshold of the memory usage, the computer being constituted by connecting a plurality of CPU sockets each including one or more CPU cores, a memory controller, a memory, and a crossbar switch.

Figure 1:
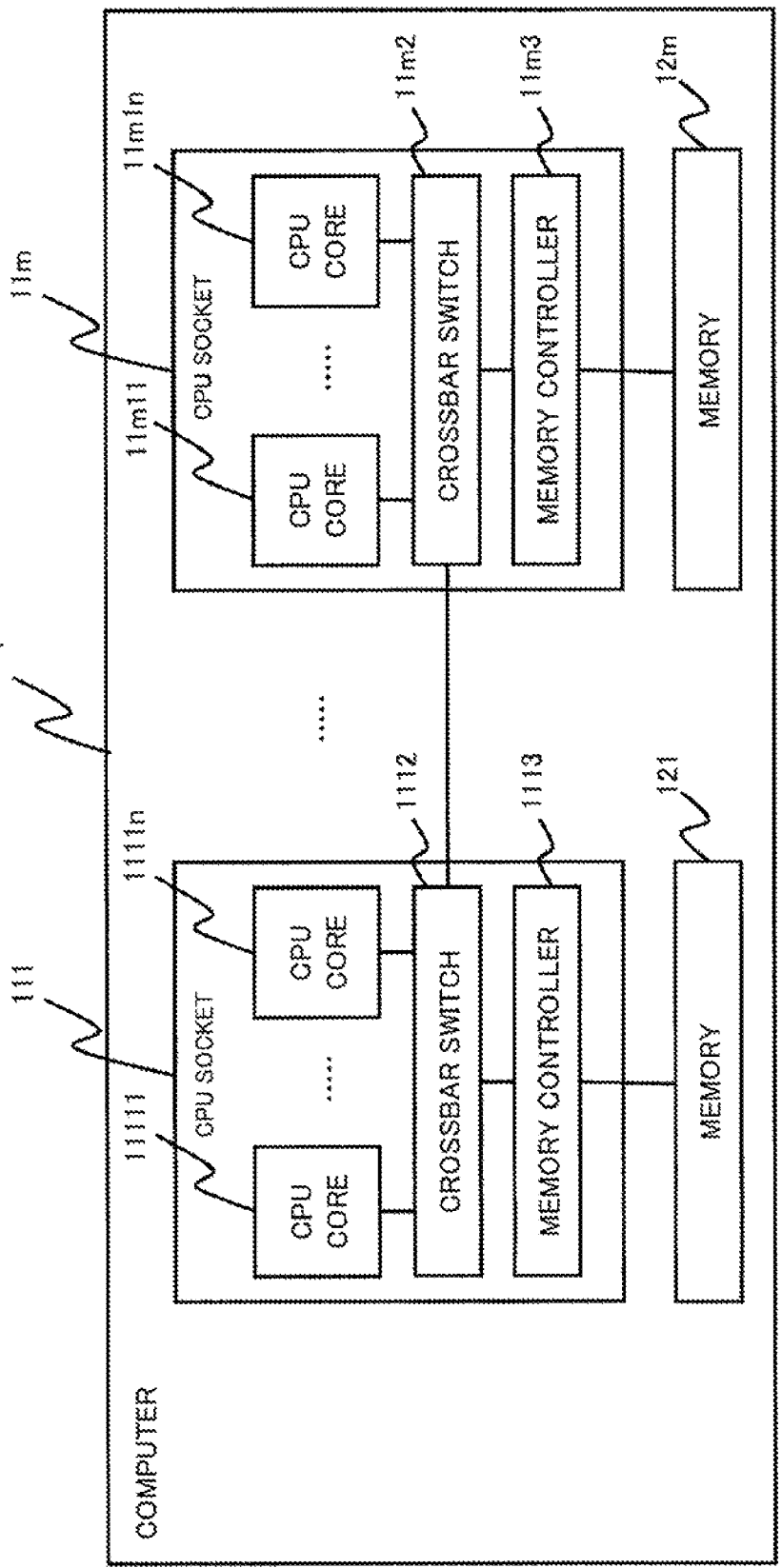
FIG. 1 A schematic block diagram showing the hardware configuration of a computer system according to an exemplary embodiment of the present invention.

FIG. 1 shows the hardware configuration of the computer system to which the method for memory relocation control of a computer according to the present exemplary embodiment is applied. The computer system shown in FIG. 1 includes a computer 1 which operates with program control. The computer 1 is constituted by connecting a plurality (in the shown example, m: m is an integer not smaller than two) of sets of a CPU socket 111 and a memory 121 connected under the CPU socket 111. The CPU socket 111 includes one or more (in the shown example, n: n is an integer not smaller than two) CPU cores 11111 to 1111n, a crossbar switch 1112, and a memory controller 1113 which is connected to the CPU cores 11111 to 1111n through the crossbar switch 1112. In other words, the computer 1 includes m CPU sockets 111 to 11m and m memories 121 to 12m which are connected under the respective CPU sockets 111 to 11m. The m CPU sockets 111 to 11m are connected through the crossbar switches 1112 to 11m2.

Figure 2A:
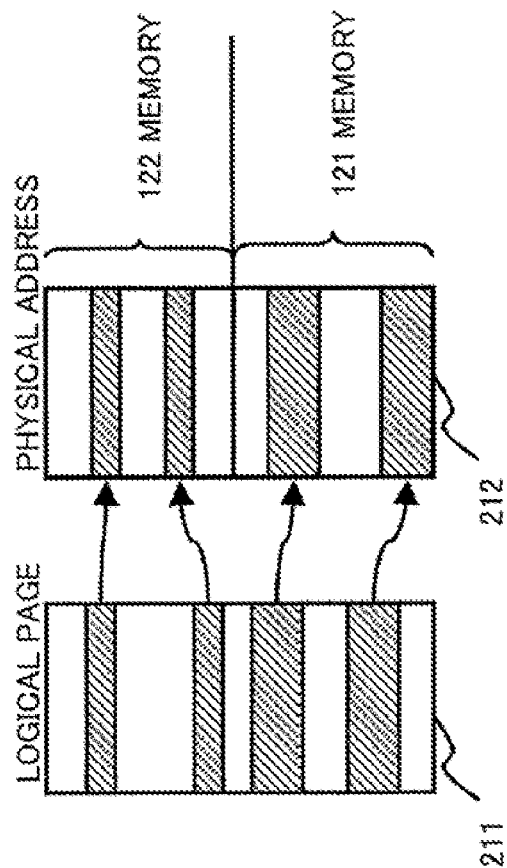
FIG. 2A is a diagram for explaining an example of the memory usage before relocation of memory contents.

FIG. 2A shows an example of the memory usage where the memory contents are not relocated (before the relocation of the memory contents). In such a case, logical pages 211 and physical addresses 212 have no particular association with each other. The physical addresses 212 are distributed and allocated over the m memories 121 to 12m shown in FIG. 1 (in the shown example, memories 121 and 122).

Figure 2B:
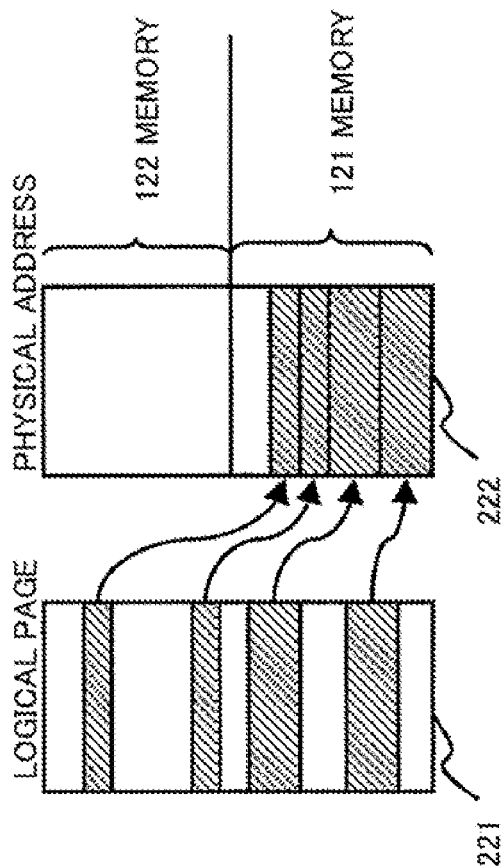
FIG. 2B is a diagram for explaining an example of the memory usage after the relocation of the memory contents.

FIG. 2B shows an example of the memory usage where the memory contents are relocated (after the relocation of the memory contents). In such a case, the memory contents distributed and allocated over the m memories 121 to 12m shown in FIG. 1 (in the shown example, memories 121 and 122) are relocated so that the memory contents are relocated (physical addresses are remapped) to certain physical addresses among the physical addresses 222 (in the shown example, physical addresses corresponding to the memory 121). This brings a certain memory or memories (in the shown example, the memory 122) from a used into unused memory state.

Next, the operation of the present exemplary embodiment will be described in detail with reference to the flowchart shown in FIG. 3. The present exemplary embodiment is predicated on that the detection of the power saving state of a CPU core, the transition and restoration to/from the power saving state, the calculation of the total memory usage, and the relocation of the memory contents are performed by publicly known technologies. A computer control program corresponding to the flowchart shown in FIG. 3 shall be executed by any of the plurality of CPU cores.

Initially, the computer determines whether or not all CPU cores in any one of the plurality of CPU cores are in a power saving state (step St1).

If all the CPU cores in the CPU socket are in the power saving state (step St1: Yes), the computer determines whether or not the usage of the memory connected under the CPU socket falls below a threshold (step St2). Suppose here that the threshold of the memory usage can be arbitrarily set in advance by the program.

On the other hand, if all the CPU core in the CPU socket are not in the power saving state (step St1: No), the computer returns to step St1 to repeat the same processing without the processing of step St2 and subsequent steps.

Next, if the determination at the foregoing step St2 shows that the usage of the memory connected under the CPU socket falls below the threshold (step St2: Yes), the computer relocates the contents of the memory to a memory that is connected under another CPU socket (step St3). Here, the physical addresses are remapped as shown in FIG. 2B seen above.

On the other hand, if the usage of the memory connected under the CPU socket does not fall below the threshold (step St2: No), the computer returns to step St1 to repeat the same processing without the processing of step St3 and the subsequent step.

By the foregoing control, all the cores in the CPU socket enter the power saving state and there is no more access to the memory under the CPU socket. The entire CPU socket in question thus enters the power saving state (step St4).

As described above, according to the present exemplary embodiment, when all the CPU cores in a CPU socket are in the power saving state and the total memory usage falls below a predetermined threshold, the contents (areas) of the memory connected under the CPU socket are relocated to a memory that is under another CPU socket. This eliminates accesses to the memory connected under the CPU socket in question, and actively brings the entire CPU socket into the power saving state.

The present exemplary embodiment thereby provides the method of reducing the power consumption when the amount of processing is small depending on the use status of use of the computer. More specifically, with the aforementioned conventional technologies, it has been less likely for a CPU socket to enter the power saving state. In contrast, the foregoing control method according to the present exemplary embodiment can be used to relocate the memories depending on the memory usage, thereby actively bringing the CPU sockets into the power saving state. This can reduce the power consumption of the computer. One reason is that the amount of use of the computer often falls depending on time and periods. Another reason is that in the case of a computer with two CPU sockets, for example, the power consumption of the CPUs and memories occupies approximately one half the total power consumption of the computer. The suppression of the power of the CPUs and memories can provide a significant effect on the reduction of the power consumption of the entire computer.

With the conventional technologies, it has not often been the case that an entire CPU socket enters the power saving state nor that a decrease in the processing load of the computer results in reduced power consumption of the computer.

According to the present exemplary embodiment, it is possible to actively bring an entire CPU socket into the power saving state when the amount of use of the computer decreases, thereby reducing the power usage of the computer.

The present exemplary embodiment is highly effective for power reduction since it is not only intended to reduce the power consumption during data backup as in the foregoing PTL2 but also capable of reducing the power consumption of the computer in normal operation as described above. The present exemplary embodiment also has the effect of high versatility since it can be implemented by only a control program without any special mechanical unit for exercising control on the data transfer between memories as in PTL2.

It should be noted that while the foregoing computer system may be implemented by hardware, a computer may read a program for making the computer function as the system from a recording medium and execute the program for implementation.

While the foregoing method for memory relocation control of a computer may be implemented by hardware, a computer may read a program (memory relocation control program) for making the computer perform the method for memory relocation control from a computer-readable recording medium and execute the program for implementation.

The foregoing hardware or software configuration is not particularly restrictive, and any configuration may be applicable as long as the functions of the foregoing respective components can be implemented. For example, independent circuits and parts may be constituted for the respective functions of the foregoing components. A plurality of functions may be integrated into a single circuit, part, etc.

Up to this point, the present invention has been described with reference to the exemplary embodiment, whereas the present invention is not limited to the foregoing exemplary embodiment. Various modifications understandable to those skilled in the art may be made to the configuration and details of the invention within the scope of the invention.

The whole or part of the exemplary embodiments disclosed above can be described as, but not limited to, the following supplementary notes.

(Supplementary note 1) A computer system comprising: a computer that includes a plurality of CPU sockets including one or more CPU cores, a crossbar switch, and a memory controller each, and a plurality of memories connected under each of the plurality of CPU sockets, the plurality of CPU sockets being connected to each other, when all the CPU cores in a CPU socket enter a power saving state and a total memory usage falls below a predetermined threshold, the computer relocating contents of the memory connected under the CPU socket to a memory connected under another CPU socket, thereby eliminating an access to the memory connected under the CPU socket and bringing a whole of the CPU socket into the power saving state.

(Supplementary note 2) The computer system according to Supplementary note 1, wherein the threshold is arbitrarily settable.

(Supplementary note 3) A method for memory relocation control of a computer that includes a plurality of CPU sockets including one or more CPU cores, a crossbar switch, and a memory controller each, and a plurality of memories connected under each of the plurality of CPU sockets, the plurality of CPU sockets being connected to each other, the method comprising: when all the CPU cores in a CPU socket enter a power saving state and a total memory usage falls below a predetermined threshold, relocating, at the computer, contents of the memory connected under the CPU socket to a memory connected under another CPU socket, thereby eliminating an access to the memory connected under the CPU socket and bringing a whole of the CPU socket into the power saving state.

(Supplementary note 4) The method according to Supplementary note 3, wherein the threshold is arbitrarily settable.

(Supplementary note 5) A computer-readable medium stored therein a program for memory relocation control of a computer that includes a plurality of CPU sockets including one or more CPU cores, a crossbar switch, and a memory controller each, and a plurality of memories connected under each of the plurality of CPU sockets, the plurality of CPU sockets being connected to each other, the program causing the computer to execute: a process of, when all the CPU cores in a CPU socket enter a power saving state and a total memory usage falls below a predetermined threshold, relocating contents of the memory connected under the CPU socket to a memory connected under another CPU socket, thereby eliminating an access to the memory connected under the CPU socket and bringing a whole of the CPU socket into the power saving state.

(Supplementary note 6) The computer-readable medium according to Supplementary note 5, wherein the threshold is arbitrarily settable.

INDUSTRIAL APPLICABILITY

The present invention may be applied to a computer system having processors.

REFERENCE SIGNS LIST

1: computer
111 to 11*m*: CPU socket
121 to 12*m*: memory
11111 to 1111*n*, 11*m*11 to 11*m*1*n*: CPU core
1112 to 11*m*2: crossbar switch
1113 to 11*m*3: memory controller

The invention claimed is:
1. A computer system comprising:
a computer that includes a plurality of CPU sockets connected to each other and their respective memories, each of the plurality of CPU sockets including one or more CPU cores, a crossbar switch, and a memory controller, the memory controller of each of the plurality of CPU sockets being connected to the one or more CPU cores through the crossbar switch and connected to a memory controlled by the respective ones of the plurality of CPU sockets, the memory being accessible from another one of the plurality of CPU sockets through the crossbar switch,
wherein the computer determines whether all the CPU cores in at least one of the plurality of CPU sockets are in a power saving state;
wherein when all the CPU cores are in a power saving state, the computer further determines whether a total usage of the memory controlled by the memory controller in the at least one of the plurality of CPU sockets falls below a predetermined threshold; and when the total usage falls below the predetermined threshold, the computer relocates contents of the memory to a memory controlled by a memory controller in another one of the plurality of CPU sockets, thereby eliminating any access from other ones of the plurality of CPU sockets to the memory connected under the at least one of the plurality of CPU sockets and bringing a whole of the at least one of the plurality of CPU sockets into the power saving state.

2. The computer system according to claim 1, wherein the threshold is arbitrarily settable.

3. A method for memory relocation in a computer that includes a plurality of CPU sockets connected to each other and their respective memories, each of the plurality of CPU sockets including one or more CPU cores, a crossbar switch, and a memory controller, the memory controller of each of the plurality of CPU sockets being connected to the one or more CPU cores through the crossbar switch and connected to a memory controlled by the respective ones of the plurality of CPU sockets, the memory being also accessible from another one of the plurality of CPU sockets through the crossbar switch the method comprising:
    determining whether all the CPU cores in at least one of the plurality of CPU sockets are in a power saving state;
    wherein when all the CPU cores are in a power saving state, further determining whether a total usage of the memory controlled by the memory controller in the at least one of the plurality of CPU sockets falls below a predetermined threshold; and when the total usage falls below the predetermined threshold, relocating contents of the memory to a memory controlled by a memory controller in another one of the plurality of CPU sockets, thereby eliminating any access from other ones of the plurality of CPU sockets to the memory connected under the at least one of the plurality of CPU sockets and bringing a whole of the at least one of the plurality of CPU sockets into the power saving state.

4. The method according to claim 3, wherein the threshold is arbitrarily settable.

5. A non-transitory computer-readable medium storing therein a program for memory relocation in a computer that includes a plurality of CPU sockets connected to each other and their respective memories, each of the plurality of CPU sockets including one or more CPU cores, a crossbar switch, and a memory controller, the memory controller of each of the plurality of CPU sockets being connected to the one or more CPU cores through the crossbar switch and connected to a memory controlled by the respective ones of the plurality of CPU sockets, the memory being also accessible from another one of the plurality of CPU sockets through the crossbar switch, the program causing the computer to execute:
    processes of determining whether all the CPU cores in at least one of the plurality of CPU sockets are in a power saving state;
    wherein when all the CPU cores are in a power saving state, further determining whether a total usage of the memory controlled by the memory controller in the at least one of the plurality of CPU sockets falls below a predetermined threshold; and when the total usage falls below the predetermined threshold, relocating contents of the memory to a memory controlled by a memory controller in another one of the plurality of CPU sockets, thereby eliminating any access from other ones of the plurality of CPU sockets to the memory connected under the at least one of the plurality of CPU sockets and bringing a whole of the at least one of the plurality of CPU sockets into the power saving state.

6. The computer-readable medium according to claim 5, wherein the threshold is arbitrarily settable.

* * * * *